(12) United States Patent
Sheridan et al.

(10) Patent No.: US 11,982,238 B2
(45) Date of Patent: May 14, 2024

(54) FAN AND LOW PRESSURE COMPRESSOR GEARED TO LOW SPEED SPOOL OF GAS TURBINE ENGINE

(71) Applicant: RAYTHEON TECHNOLOGIES CORPORATION, Farmington, CT (US)

(72) Inventors: William G. Sheridan, Southington, CT (US); Michael E. McCune, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/881,399

(22) Filed: Aug. 4, 2022

(65) Prior Publication Data

US 2022/0372918 A1 Nov. 24, 2022

Related U.S. Application Data

(62) Division of application No. 17/236,850, filed on Apr. 21, 2021, now Pat. No. 11,434,829, which is a
(Continued)

(51) Int. Cl.
*F16H 1/28* (2006.01)
*F02C 7/36* (2006.01)

(52) U.S. Cl.
CPC .............. *F02C 7/36* (2013.01); *F16H 1/28* (2013.01); *F05D 2220/36* (2013.01); *F05D 2260/40311* (2013.01)

(58) Field of Classification Search
CPC ............... F16H 1/28; F05D 2220/36; F05D 2260/40311; F05D 2220/323;
(Continued)

(56) References Cited

U.S. PATENT DOCUMENTS 2,583,872 A 1/1952 Newcomb et al.
4,817,382 A * 4/1989 Rudolph ................... F02C 3/10
416/129

(Continued)

FOREIGN PATENT DOCUMENTS

DE 102005018140 A1 * 11/2006 ............. F02C 3/067
EP 3101258 12/2016
EP 3330515 6/2018

OTHER PUBLICATIONS

Guy Norris, "Hybrid Turbofan Concept Offers Bridge To Electric Future", Aviation Week Intelligence Network, Jul. 11, 2018, http://awin.aviationweek.com/ArticlesStory/ArticlesPrint.aspx?id=8d292e4d-4cfd-4779-a8.
(Continued)

*Primary Examiner* — Tisha D Lewis
(74) *Attorney, Agent, or Firm* — SNELL & WILMER L.L.P.

(57) ABSTRACT

A gas turbine engine may include a high speed spool, a low speed spool, a first epicyclic gear system, and a second epicyclic gear system. Generally, the high speed spool mechanically connects a high pressure turbine to a high pressure compressor, and the low speed spool mechanically connects a low pressure turbine to at least one of a fan and a prop via the first epicyclic gear system and to a low pressure compressor via the second epicyclic gear system, according to various embodiments. The first epicyclic gear system and the second epicyclic gear system may include a common sun gear shaft.

8 Claims, 6 Drawing Sheets

Related U.S. Application Data division of application No. 16/671,432, filed on Nov. 1, 2019, now Pat. No. 11,015,533.

(60) Provisional application No. 62/780,622, filed on Dec. 17, 2018.

(58) Field of Classification Search
CPC ......... F05D 2220/324; F05D 2220/325; F02C 7/36; F02C 3/107; F02K 3/06
See application file for complete search history.

(56) References Cited

U.S. PATENT DOCUMENTS

| | | | |
|---|---|---|---|
| 8,402,742 B2 | 3/2013 | Roberge et al. | |
| 8,590,286 B2 | 11/2013 | Roberge et al. | |
| 9,039,567 B2 | 5/2015 | Fabre | |
| 9,745,898 B2 | 8/2017 | Blaney et al. | |
| 9,890,704 B2 | 2/2018 | Speak et al. | |
| 10,041,498 B2 | 8/2018 | Otto et al. | |
| 10,330,017 B2 | 6/2019 | Otto et al. | |
| 10,487,748 B2 | 11/2019 | Trinks | |
| 10,502,143 B2 | 12/2019 | Hiernaux | |
| 10,669,946 B2 | 6/2020 | Sheridan | |
| 11,015,533 B2 | 5/2021 | Sheridan et al. | |
| 2008/0060341 A1* | 3/2008 | Loisy | F02K 3/02 60/793 |
| 2008/0120839 A1* | 5/2008 | Schilling | F02C 7/36 60/226.1 |
| 2009/0145102 A1* | 6/2009 | Roberge | F01D 1/023 415/68 |
| 2014/0241856 A1 | 8/2014 | Roberge et al. | |
| 2016/0090988 A1* | 3/2016 | Venter | F04D 19/002 416/171 |
| 2016/0102607 A1 | 4/2016 | Hiernaux | |
| 2016/0131028 A1 | 5/2016 | Lauer et al. | |
| 2016/0138477 A1* | 5/2016 | Otto | F02K 3/06 415/122.1 |
| 2016/0177841 A1 | 6/2016 | Blaney et al. | |
| 2016/0356225 A1* | 12/2016 | Sheridan | F02C 7/36 |
| 2018/0216725 A1 | 8/2018 | Scognamiglio et al. | |
| 2018/0299477 A1 | 10/2018 | Topol et al. | |

OTHER PUBLICATIONS

European Patent Office, European Search Report dated May 4, 2020 in Application No. 19217249.2.
USPTO, Pre-Interview First Office Action dated Jan. 13, 2021 in U.S. Appl. No. 16/671,432.
USPTO, Notice of Allowance dated Feb. 23, 2021 in U.S. Appl. No. 16/671,432.
USPTO, Non-Final Office Action dated Jan. 20, 2022 in U.S. Appl. No. 17/236,850.
USPTO, Notice of Allowance dated May 3, 2022 in U.S. Appl. No. 17/236,850.

\* cited by examiner

FAN AND LOW PRESSURE COMPRESSOR GEARED TO LOW SPEED SPOOL OF GAS TURBINE ENGINE

CROSS-REFERENCE TO RELATED APPLICATIONS

This application is a divisional of, claims priority to and the benefit of, U.S. Ser. No. 17/236,850 filed on Apr. 21, 2021 and entitled "FAN AND LOW PRESSURE COMPRESSOR GEARED TO LOW SPEED SPOOL OF GAS TURBINE ENGINE." The '850 application is a divisional of, and claims priority to and benefit to, U.S. Ser. No. 16/671,432 filed on Nov. 1, 2019 and entitled "FAN AND LOW PRESSURE COMPRESSOR GEARED TO LOW SPEED SPOOL OF GAS TURBINE ENGINE" which issued as U.S. Pat. No. 11,015,533 issued May 25, 2021. The '432 application claims priority to U.S. provisional patent application Ser. No. 62/780,622, filed on Dec. 17, 2018 and entitled "FAN AND LOW PRESSURE COMPRESSOR GEARED TO LOW SPEED SPOOL OF GAS TURBINE ENGINE." All of which are incorporated herein by reference in their entireties for all purposes.

FIELD

The present disclosure relates to gas turbine engines, and more specifically to fan and low pressure compressor configurations of gas turbine engines.

BACKGROUND

Conventional two-spool gas turbine engines (e.g., two-spool turbofan engines) typically include a low pressure compressor configured to be rotated by a low pressure turbine via a low speed spool, and a high pressure compressor configured to be rotated by a high pressure turbine via a high speed spool. Conventional efforts to optimize efficiency and maximize power include mechanically connecting the low pressure compressor to the low speed spool via a gearbox while the fan is directly driven off of the low speed spool. However, such conventional architectures may require a large low pressure turbine and may limit the bypass ratio of the gas turbine engine.

SUMMARY

In various embodiments, the present disclosure provides a gas turbine engine that includes a high speed spool, a low speed spool, a first epicyclic gear system, and a second epicyclic gear system. Generally, the high speed spool mechanically connects a high pressure turbine to a high pressure compressor, and the low speed spool mechanically connects a low pressure turbine to at least one of a fan and a prop via the first epicyclic gear system and to a low pressure compressor via the second epicyclic gear system, according to various embodiments.

In various embodiments, the first epicyclic gear system and the second epicyclic gear system comprise a common sun gear shaft. For example, the common sun gear shaft may be a section of the low speed spool, and may include a first portion that is forward of a second portion, wherein the first portion is mechanically connected to the first epicyclic gear system and the second portion is mechanically connected to the second epicyclic gear system. In various embodiments, the first and second portions of the common sun gear shaft may have the same radius, or may have different radiuses. That is, the first portion of the common sun gear shaft (e.g., the first sun gear) may have a different radius than the second portion of the common sun gear shaft (e.g., the second sun gear).

In various embodiments, the first epicyclic gear system and the second epicyclic gear system are mounted to a common static support structure. In various embodiments, the at least one of the fan and the prop and the low pressure compressor are mounted to a common static support structure. In various embodiments, the first epicyclic gear system, the second epicyclic gear system, the at least one of the fan and the prop, and the low pressure compressor are all mounted to a common static support structure.

In various embodiments, the common static support structure is parallel to an engine central longitudinal axis of the gas turbine engine. The common static support structure may be mounted to a structural case aft of both the at least one of the fan and the prop and the low pressure compressor, but forward of the high pressure compressor. In various embodiments, the at least one of the fan and the prop is the fan, and the fan and the low pressure compressor are configured to rotate in a same direction. In various embodiments, the fan and the low pressure compressor are configured to rotate in opposite directions.

In various embodiments, the first epicyclic gear system is a planetary-type system. In such embodiments, the first epicyclic gear system may include a gear carrier mounted to intermediate gears, and the fan may be coupled to the gear carrier. In various embodiments, the second epicyclic gear system is a star-type system. In such embodiments, the second epicyclic gear system may include a rotating ring gear, and the low pressure compressor may be coupled to the rotating ring gear.

Also disclosed herein, according to various embodiments, is a method of operating a gas turbine engine, the method comprising operating at least one of a fan and a prop at a first operating speed and operating a low pressure compressor at a second operating speed. In various embodiments, the at least one of the fan and the prop and the low pressure compressor are mechanically connected to a low speed spool of the gas turbine engine via a first epicyclic gear system and a second epicyclic gear system, respectively.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
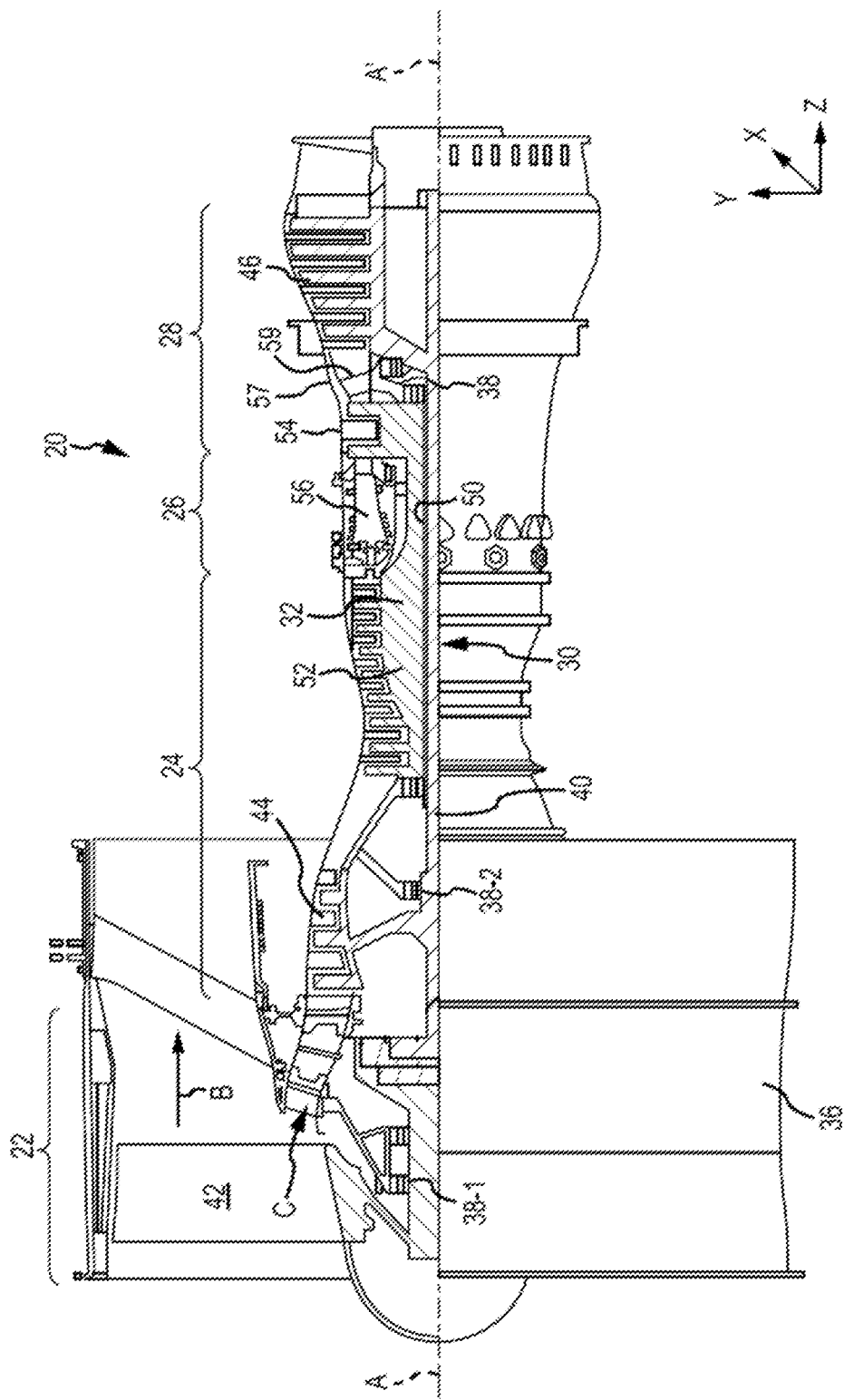
FIG. 1 is a cross-sectional view of a typical gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a gas turbine engine that uses two epicyclic gear systems driven off of the low speed spool of the gas turbine engine to drive the fan and the low pressure compressor, respectively. With both the fan and the low pressure compressor being geared off of the low speed spool, the operating speed of the fan and the low pressure compressor can be independent configured/optimized in order to improve the operating efficiency of a two-spool gas turbine engine.

In various embodiments and with reference to FIG. 1, a typical gas turbine engine 20 is provided. Gas turbine engine 20 may be a two-spool turbofan that generally incorporates a fan section 22, a compressor section 24, a combustor section 26 and a turbine section 28. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Typical gas turbine engines 20 generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axis. The y direction on the provided xyz axis refers to radial directions and the x direction on the provided xyz axis refers to the circumferential direction. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. As described in greater detail below with reference to the remaining figures, the fan 42 and the low pressure compressor 44 may be geared to the low speed spool 30. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, and as described in greater detail below, both the fan and the low pressure compressor may be mechanically connected to the low speed spool using a geared architecture, such as an epicyclic gear system. The geared architecture may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2A:
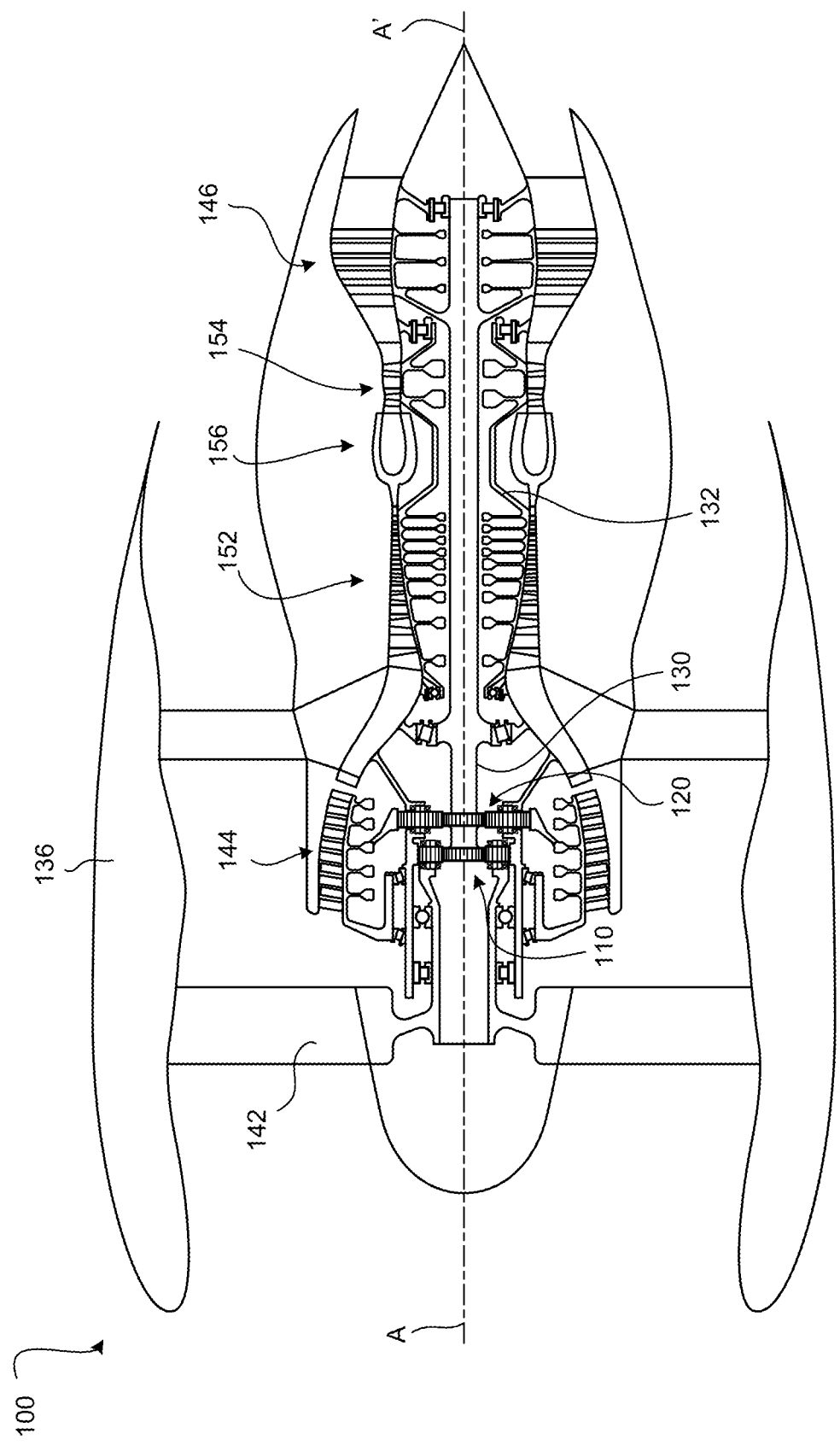
FIG. 2A is a cross-sectional view of a gas turbine engine having a geared fan and a geared low pressure compressor, in accordance with various embodiments.
Figure 2B:
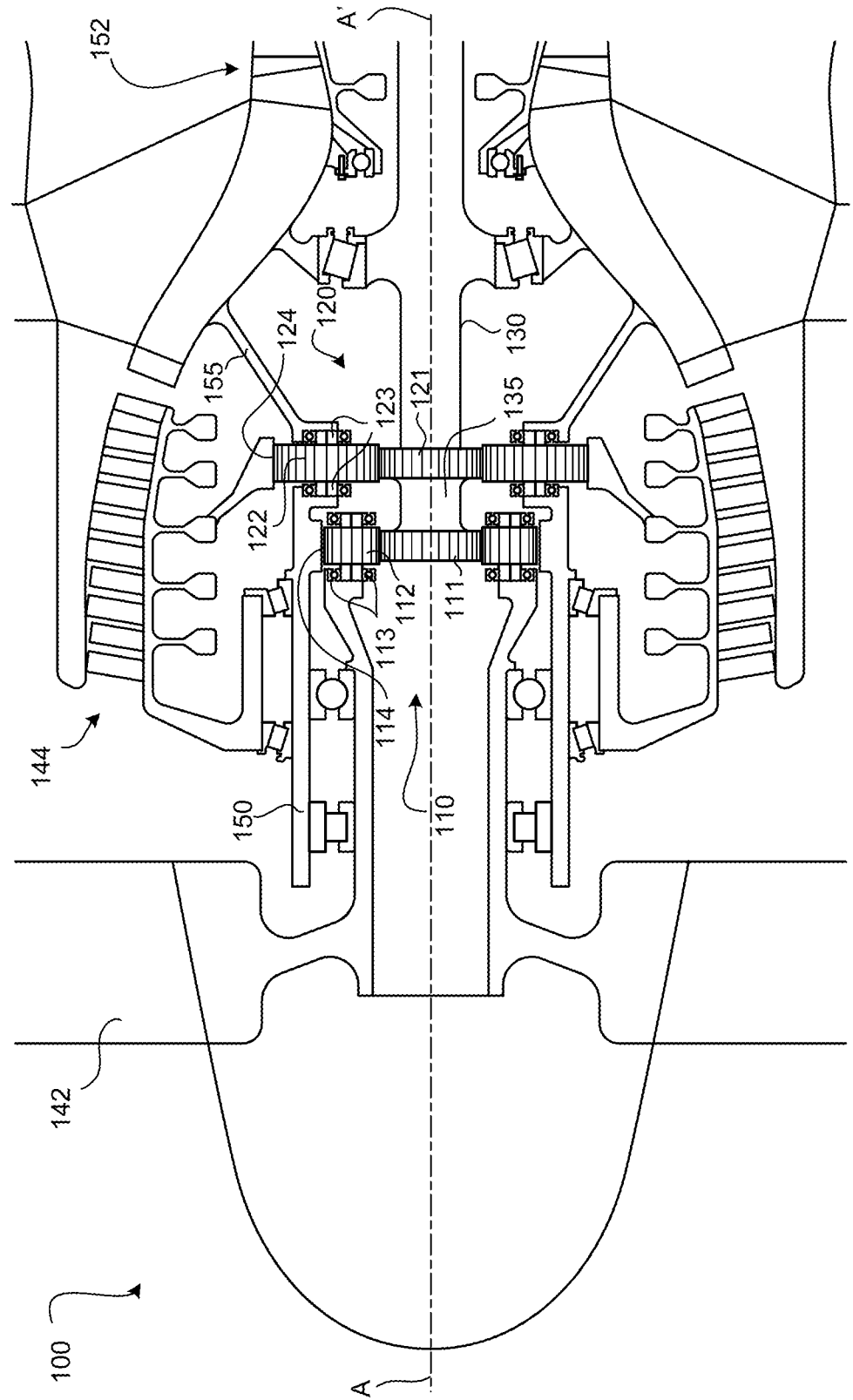
FIG. 2B is a magnified view of a portion of the gas turbine engine of FIG. 2A, in accordance with various embodiments.

Disclosed herein, in accordance with various embodiments and with reference to FIGS. 2A and 2B, is a gas turbine engine 100 having a low speed spool 130 and a high speed spool 132, with a fan 142 being mechanically connected to the low speed spool 130 via a first epicyclic gear system 110 and a low pressure compressor 144 mechanically connected to the low speed spool 130 via a second epicyclic gear system 120. Thus, the gas turbine engine described below throughout the remainder of this disclosure may differ from the gas turbine engine 20 shown and described above with reference to FIG. 1 because both the fan 142 and the low pressure compressor 144 (FIG. 2) are driven/rotated by the low speed spool 130 via first and second epicyclic gear systems 110, 120, respectively.

In various embodiments, the high speed spool 132 of the gas turbine engine 100 mechanically connects a high pressure turbine 154 to a high pressure compressor 152. Still further, the gas turbine engine 100 may include an engine case 136 and a combustor 156 disposed between the high pressure compressor 152 and the high pressure turbine 154. As used herein, the phrase "mechanically coupled" or "mechanically connected" means connected, whether directly or indirectly, in power-transferring communication via mechanical components structures (gears, shafts, etc.). Also, while numerous details are included herein pertaining to a fan of a gas turbine engine, a similar configuration may be employed for an engine that includes a prop (instead of a fan) that is forward of a low pressure compressor.

In various embodiments, by mechanically coupling both the fan 142 and the low pressure compressor 144 to the low speed spool via respective epicyclic gear systems 110, 120, improved operational efficiency may be achieved because the speeds of the fan 142 and the low pressure compressor 144 may be independently configured, and may be different from the speed of the low speed spool 130. That is, the gas turbine engine 100 may be enabled to operate with improved efficiency and/or with improved power because the relative operating speeds of the fan 142, the low pressure compressor 144, and the low speed spool 130 may be independently configured based on expected operating/use parameters.

In various embodiments, and with reference to FIG. 2B, the low speed spool 130 has a forward section or a forward portion that defines a common sun gear shaft 135 for both the first and second epicyclic gear systems 110, 120. That is, the low speed spool 130 may comprise a portion or section (e.g., common sun gear shaft 135) that defines or is mechanically coupled to both a first sun gear 111 of the first epicyclic gear system 110 and a second sun gear 121 of the second epicyclic gear system 120. Each of the epicyclic gear systems 110, 120 includes a plurality of intermediate gears 112, 122, a gear carrier 113, 123, and a ring gear 114, 124. More specifically, the first epicyclic gear system 110 includes a first sun gear 111, a first plurality of intermediate gears 112, a first gear carrier 113, and a first ring gear 114 and the second epicyclic gear system 120 includes a second sun gear 121, a second plurality of intermediate gears 122, a second gear carrier 123, and a second ring gear 124, according to various embodiments. Generally, each gear carrier 113, 123 is coupled to a respective plurality of intermediate gears 112, 122, and each plurality of intermediate gears 112, 122 is disposed between the respective sun gear 111, 121 and the respective ring gear 114, 124.

In various embodiments, and with continued reference to FIG. 2B, the first sun gear 111 has the same radius as the second sun gear 121. In various embodiments, the first epicyclic gear system 110 is a planetary-type system such that the first plurality of intermediate gears 112 and the first gear carrier 113 revolve about the first sun gear 111, with the first ring gear 114 being static. Accordingly, the fan 142 may be mechanically coupled to the first gear carrier 113. In various embodiments, and with continued reference to FIG. 2B, the second epicyclic gear system 120 is a star-type system such that the second plurality of intermediate gears 122 and the second gear carrier 123 do not revolve around the second sun gear 121, and instead the second ring gear 124 rotates around the second sun gear 121. Accordingly, the low pressure compressor 144 may be mechanically coupled to the second ring gear 124.

In various embodiments, the fan 142 and the low pressure compressor 144 are configured to operate in the same direction. In various embodiments, the fan 142 and the low pressure compressor 144 are configured to operate in different directions. Further, as mentioned above, not only may the rotational directions of the fan 142 and the low pressure compressor 144 be different from each other, but the speeds may be different from each other, and/or may be different from the speed of the low speed spool 130 itself.

In various embodiments, the gas turbine engine 100 includes a common static support structure 150 for the first and second epicyclic gear systems 110, 120. For example, the static first ring gear 114 of the first epicyclic gear system may be mechanically coupled the common static support structure 150 and the static second gear carrier 123 may be mechanically coupled to the common static support structure 150. In various embodiments, these connections may be direct connections. That is, respective static portions of the first and second epicyclic gears systems may both be directly mechanically coupled to the common static support structure 150.

In various embodiments, the fan 142 and the low pressure compressor 144 are both supported, using one or more bearings, against the common static support structure 150. For example, the common static support structure 150 may be radially outward of and concentric with a shaft portion of the fan 142 and a shaft portion of the low pressure compressor 144 may be radially outward of and concentric with the common static support structure 150.

In various embodiments, the common static support structure 150 is parallel to the engine central longitudinal axis A-A' of the gas turbine engine 100. The common static support structure 150, according to various embodiments and with continued reference to FIG. 2B, is mechanically mounted to a structural case (e.g., engine case 136 of FIG. 2A) via support member 155. Support member 155 extend from the common static support structure 150 toward a location that is aft of both the fan 142 and the low pressure compressor 144. In various embodiments, this support member 155 is positioned forward of the high pressure compressor 152.

Figure 3:
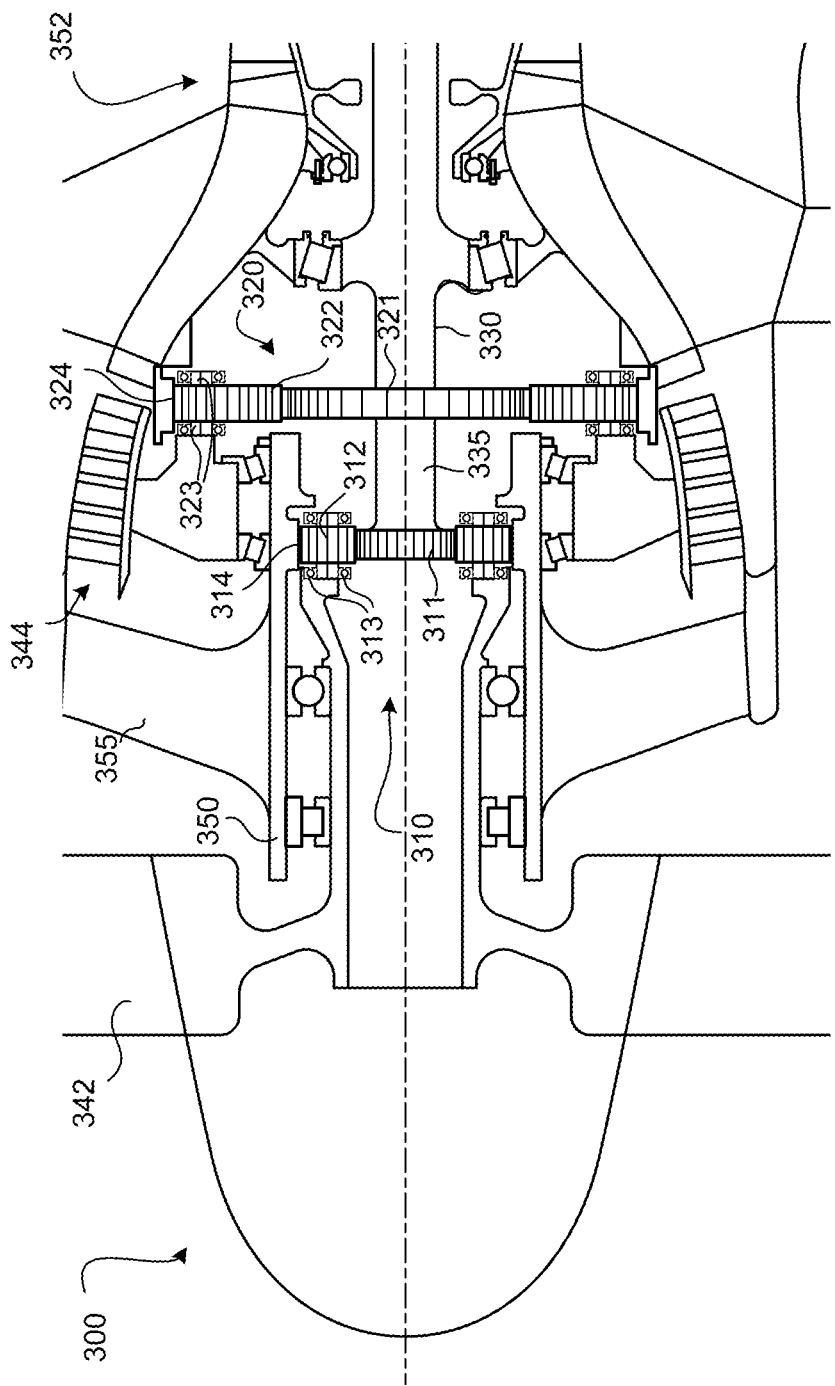
FIG. 3 is a cross-sectional view of a portion of a gas turbine engine, in accordance with various embodiments.

In various embodiments, and with reference to FIG. 3, the first sun gear 311 of the first epicyclic gear system 310 and the second sun gear 321 of the second epicyclic gear system 320 have different radii. For example, the low speed spool 330 of the gas turbine engine 300 may comprise a common sun gear shaft 335 that comprises the first sun gear 311 and the second sun gear 321, and the first sun gear 311 may have a radius that is smaller than the radius of the second sun gear 321. In various embodiments, both epicyclic gear systems 310, 320 are planetary-type systems, with corresponding shaft portions of the fan 342 and the low pressure compressor 344 being mechanically coupled to the respective gear carriers 313, 323. In various embodiments, both rotating shaft portions of the fan 342 and the low pressure compressor 344 are rotatably supported, via one or more bearings, by the common static support structure 350. The common static support structure 350 may be mechanically coupled directly to one of the static ring gears of the epicyclic gear systems 310, 320. In various embodiments, the common static support structure 350 is coupled to the engine case via support member 355, which may extend between the fan 342 and the low pressure compressor 344.

In various embodiments, the static first ring gear 314 of the first epicyclic gear system 310 is directly mechanically coupled to the common static support structure 350. In various embodiments, the static second ring gear 324 of the second epicyclic gear system 320 is mechanically coupled to a portion of the structural case disposed between the low pressure compressor 344 and the high pressure compressor 352.

Figure 4:
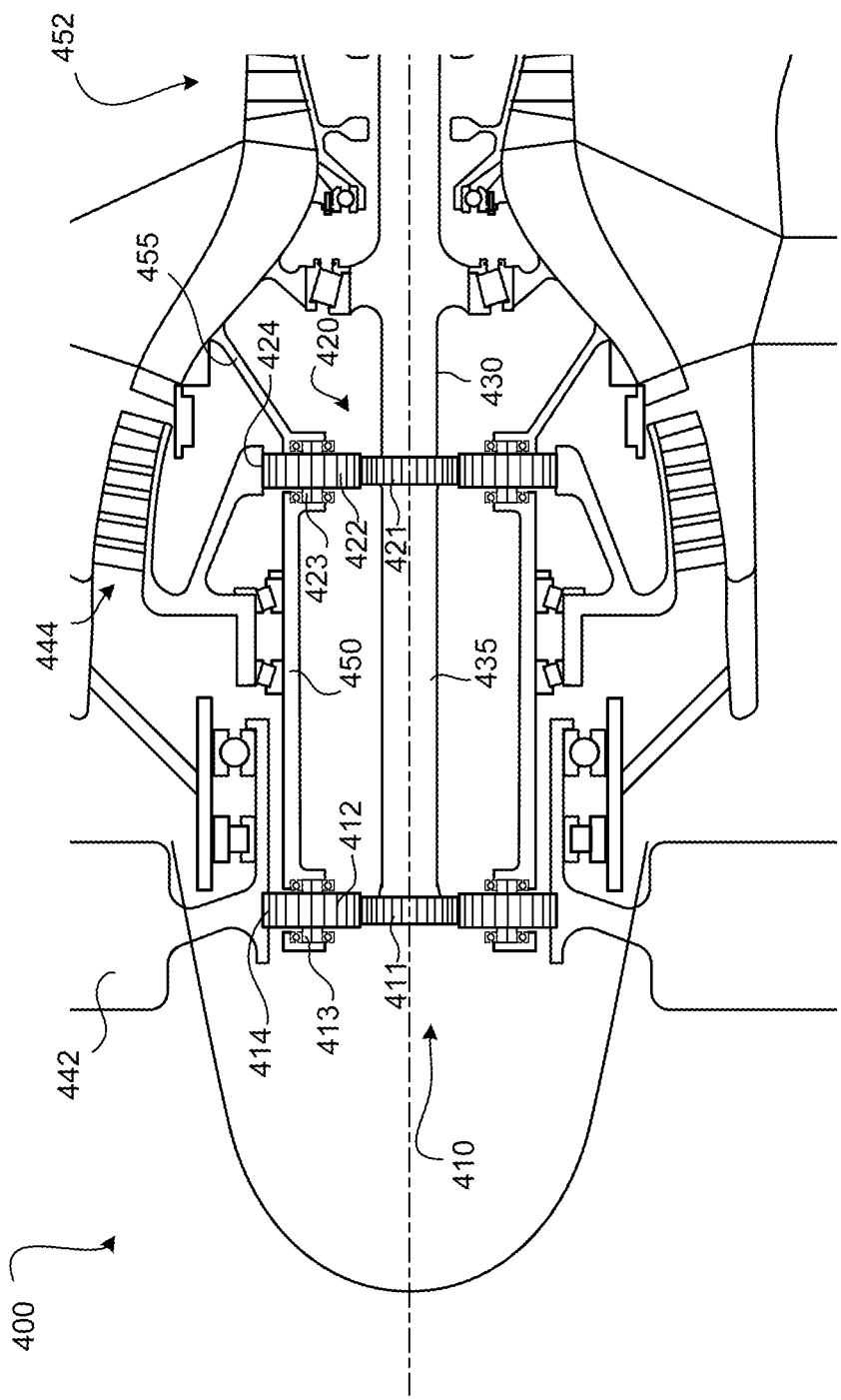
FIG. 4 is a cross-sectional view of a portion of a gas turbine engine, in accordance with various embodiments.

In various embodiments, and with reference to FIG. 4, the first sun gear 411 of the first epicyclic gear system 410 and the second sun gear 421 of the second epicyclic gear system 420 have the same radius. That is, the low speed spool 430 of the gas turbine engine 400 may comprise a common sun gear shaft 435 having first and second sun gears 411, 421 that have the same radius. In various embodiments, both epicyclic gear systems 410, 420 are star-type systems having static intermediate gears 412, 422 and respective gear carriers 413, 423, with corresponding shaft portions of the fan 442 and the low pressure compressor 444 being mechanically coupled to the respective rotating ring gears 414, 424.

In various embodiments, one or both rotating shaft portions of the fan 442 and the low pressure compressor 444 are rotatably supported, via one or more bearings, by the common static support structure 450, with the common static support structure 450 being mechanically coupled directly to the static gear carriers 413, 423 of the epicyclic gear systems 410, 420. For example, the common static support structure 450 may extend between the respective gear carriers 413, 423. In various embodiments, the common static support structure 450 is coupled to the engine case via support member 455, which may extend aft from the second epicyclic gear system 420 toward a location aft of both the fan 442 and the low pressure compressor 444 but forward of the high pressure compressor 452.

Figure 5:
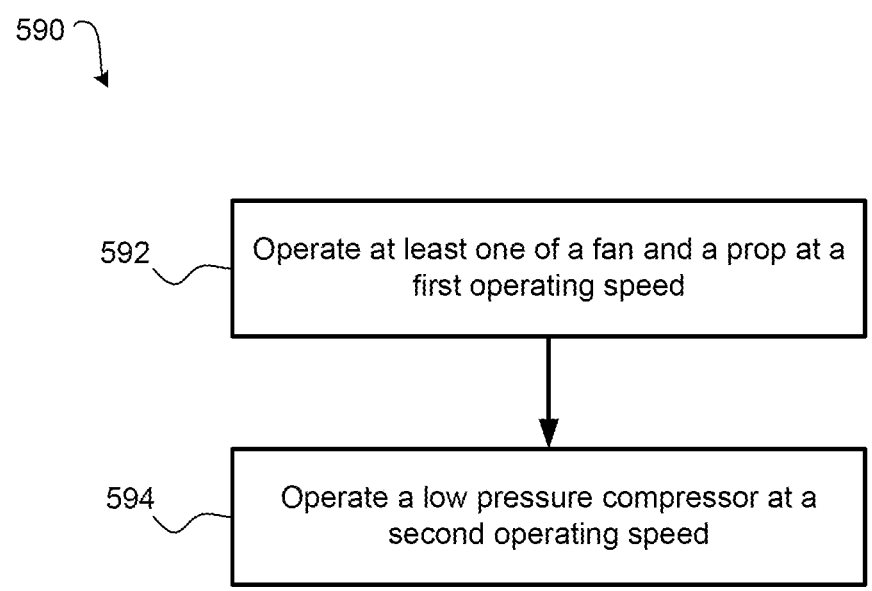
FIG. 5 is a schematic flow chart diagram of a method of operating a gas turbine engine, in accordance with various embodiments.

In various embodiments, and with reference to FIG. 5, a method 590 of operating a gas turbine engine is provided. The method 590 may include operating at least one of a fan and a prop at a first operating speed at step 592 and operating a low pressure compressor at a second operating speed at step 594. In such a method 590, the at least one of the fan and the prop and the low pressure compressor are mechanically connected to a low speed spool of the gas turbine engine via a first epicyclic gear system and a second epicyclic gear system, respectively.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine comprising:
   one of a fan or a prop;
   a low pressure compressor;
   a high speed spool mechanically connecting a high pressure turbine to a high pressure compressor;
   a first epicyclic gear system;
   a second epicyclic gear system; and
   a low speed spool mechanically connecting a low pressure turbine to one of the fan or the prop via the first epicyclic gear system and to the low pressure compressor via the second epicyclic gear system, the low speed spool comprising a forward section defining a sun gear shaft for both the first epicyclic gear system and the second epicyclic gear system, wherein:

the low pressure compressor is immediately aft of the one of the fan or the prop, the first epicyclic gear system, the second epicyclic gear system, the one of the fan or the prop, and the low pressure compressor are mounted to a common static support structure, and the low speed spool is configured to drive the first epicyclic gear system and the second epicyclic gear system via the sun gear shaft.

2. The gas turbine engine of claim 1, wherein the common static support structure is parallel to an engine central longitudinal axis of the gas turbine engine.

3. The gas turbine engine of claim 2, wherein the common static support structure is mounted to a structural case aft of the one of the fan or the prop and the low pressure compressor, but forward of the high pressure compressor.

4. The gas turbine engine of claim 1, wherein the one of the fan or the prop is the fan, and wherein the fan and the low pressure compressor are configured to rotate in opposite directions.

5. The gas turbine engine of claim 1, wherein the second epicyclic gear system is a star system.

6. The gas turbine engine of claim 5, wherein:
the second epicyclic gear system comprises a rotating ring gear;
the low pressure compressor is coupled to the rotating ring gear.

7. The gas turbine engine of claim 1, wherein a first speed of the fan and a second speed of the low pressure compressor are independently configured.

8. The gas turbine engine of claim 7, wherein the first speed and the second speed are both different from a third speed of the low speed spool.

* * * * *